United States Patent
Eguchi et al.

(10) Patent No.: US 8,892,316 B2
(45) Date of Patent: Nov. 18, 2014

(54) CONTROL SYSTEM FOR VEHICLE

(75) Inventors: Takahiro Eguchi, Wako (JP); Toshihiko Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 13/119,093

(22) PCT Filed: Sep. 10, 2009

(86) PCT No.: PCT/JP2009/065786
§ 371 (c)(1),
(2), (4) Date: Mar. 15, 2011

(87) PCT Pub. No.: WO2010/032666
PCT Pub. Date: Mar. 25, 2010

(65) Prior Publication Data
US 2011/0166755 A1    Jul. 7, 2011

(30) Foreign Application Priority Data
Sep. 17, 2008    (JP) .................................. 2008-237271

(51) Int. Cl.
G06F 7/00    (2006.01)
(Continued)

(52) U.S. Cl.
CPC .............. B60W 50/082 (2013.01); *F16H 61/66* (2013.01); *F02D 13/0207* (2013.01);
(Continued)

(58) Field of Classification Search
USPC .................. 701/54, 55, 70, 93; 123/349, 350; 477/46, 48; 180/65.28; 903/903, 909, 903/918, 945, 946
See application file for complete search history.

(56) References Cited

U.S. PATENT DOCUMENTS 4,515,040 A    5/1985 Takeuchi et al.
4,637,280 A *  1/1987 Oshiage ........................... 477/43
(Continued)

FOREIGN PATENT DOCUMENTS

DE    196 25 936 A1    1/1998
EP    1 382 477 A1    1/2004
(Continued)

OTHER PUBLICATIONS

European Search Report application No. EP 09 81 4511 dated Feb. 29, 2012.

*Primary Examiner* — Dalena Tran
*Assistant Examiner* — Jaime Figueroa
(74) *Attorney, Agent, or Firm* — Squire Patton Boggs (US) LLP

(57) ABSTRACT

A demand driving force parameter indicative of a demand driving force of the engine is set based on the accelerator pedal operation amount, and a target value of an engine driving force control amount is set based on the demand driving force parameter. The engine driving force control amount is controlled so as to coincide with the target value. A target rotational speed of the engine is set based on the demand driving force parameter, and the continuously variable transmission is controlled so that the rotational speed of the engine coincides with the target rotational speed. One of a first operation mode and a second operation mode is selectable, wherein the fuel consumption rate in the second operation mode is less than the fuel consumption rate in the first operation mode. When the second operation mode is selected, the demand driving force parameter corresponding to the accelerator pedal operation amount is set to a value which is smaller than a value of the demand driving force parameter in the first operation mode, and the target value is calculated based on a first predetermined characteristic preliminarily set according to the engine rotational speed and the demand driving force parameter. The first predetermined characteristic is set so that the target value corresponding to the same engine rotational speed is substantially constant in a first predetermined range of the demand driving force parameter.

8 Claims, 5 Drawing Sheets

(51) Int. Cl.
  *G06F 17/00* (2006.01)
  *G06F 19/00* (2011.01)
  *B60W 10/101* (2012.01)
  *F02D 29/02* (2006.01)
  *B60W 30/188* (2012.01)
  *B60W 50/08* (2012.01)
  *B60W 10/06* (2006.01)
  *F16H 61/66* (2006.01)
  *F02D 13/02* (2006.01)

(52) U.S. Cl.
  CPC ...... *B60W 10/101* (2013.01); *B60W 2710/105* (2013.01); *F02D 29/02* (2013.01); *B60W 30/188* (2013.01); *B60W 2710/0644* (2013.01); *B60W 10/06* (2013.01)
  USPC ................ 701/54; 701/55; 123/349; 477/46; 477/48

(56) References Cited

U.S. PATENT DOCUMENTS

| | | | | |
|---|---|---|---|---|
| 4,793,217 | A * | 12/1988 | Morisawa et al. | 477/41 |
| 5,075,860 | A * | 12/1991 | Suzuki | 701/60 |
| 5,413,540 | A | 5/1995 | Streib et al. | |
| 5,489,003 | A * | 2/1996 | Ohyama et al. | 180/65.6 |
| 5,754,428 | A * | 5/1998 | Ishikawa | 701/55 |
| 5,961,418 | A * | 10/1999 | Taniguchi et al. | 477/47 |
| 6,019,701 | A * | 2/2000 | Mori et al. | 477/46 |
| 6,066,070 | A * | 5/2000 | Ito et al. | 477/43 |
| 6,244,986 | B1 * | 6/2001 | Mori et al. | 477/46 |
| 6,278,915 | B1 * | 8/2001 | Deguchi et al. | 701/22 |
| 6,379,282 | B1 * | 4/2002 | Aoki | 477/109 |
| 6,389,348 | B1 * | 5/2002 | Takagi et al. | 701/58 |
| 6,450,917 | B2 * | 9/2002 | Taniguchi et al. | 477/49 |
| 6,823,250 | B2 * | 11/2004 | Yamaguchi et al. | 701/51 |
| 7,010,408 | B2 * | 3/2006 | Kitazawa et al. | 701/70 |
| 7,641,016 | B2 * | 1/2010 | Unno et al. | 180/230 |
| 7,801,661 | B2 * | 9/2010 | Masterson et al. | 701/99 |
| 2003/0060961 | A1 * | 3/2003 | Ishizu et al. | 701/93 |
| 2003/0176256 | A1 * | 9/2003 | Kamichi et al. | 477/5 |
| 2004/0128048 | A1 * | 7/2004 | Iwatuki et al. | 701/54 |
| 2004/0128057 | A1 * | 7/2004 | Kitazawa et al. | 701/110 |
| 2004/0251064 | A1 * | 12/2004 | Imai | 180/65.2 |
| 2007/0060443 | A1 * | 3/2007 | Kageyama et al. | 477/64 |
| 2008/0059035 | A1 * | 3/2008 | Siddiqui et al. | 701/54 |
| 2008/0179126 | A1 * | 7/2008 | Unno et al. | 180/230 |
| 2008/0208422 | A1 * | 8/2008 | Shibata et al. | 701/54 |
| 2008/0228334 | A1 * | 9/2008 | Hashimoto | 701/22 |
| 2008/0306670 | A1 * | 12/2008 | Masterson et al. | 701/99 |
| 2009/0082154 | A1 * | 3/2009 | Iwase et al. | 475/150 |
| 2009/0125199 | A1 * | 5/2009 | Kaigawa | 701/54 |
| 2010/0070146 | A1 * | 3/2010 | Ishii et al. | 701/50 |

FOREIGN PATENT DOCUMENTS

| | | |
|---|---|---|
| GB | 2 322 917 A | 9/1998 |
| JP | 58-039870 | 3/1983 |
| JP | 59-074341 | 4/1984 |
| JP | 63-038742 | 2/1988 |
| JP | 63-248939 | 10/1988 |
| JP | 5-65037 | 3/1993 |
| JP | 6-294464 | 10/1994 |
| JP | 10-306869 A | 11/1998 |
| JP | 11-227500 | 8/1999 |
| JP | 2005-61428 | 3/2005 |
| JP | 2008-168866 A | 7/2008 |

\* cited by examiner

CONTROL SYSTEM FOR VEHICLE

TECHNICAL FIELD

The present invention relates to a control system for a vehicle having a continuously variable transmission and driven by an internal combustion engine, and particularly to a control system for the vehicle whose operation mode is switchable for reducing the fuel consumption rate.

BACKGROUND ART

The patent document 1 (listed below) discloses a control system for a vehicle having a continuously variable transmission. According to this system, a target engine rotational speed is calculated for realizing a demand engine output (power) according to an accelerator operation amount at a minimum fuel consumption rate. The gear ratio of the continuously variable transmission is controlled so that an actual engine rotational speed coincides with the target engine rotational speed.

When the gear ratio of the continuously variable transmission is controlled so as to perform the minimum fuel consumption operation as shown in the patent document 1, there is a problem that the acceleration response of the engine which the driver expects is not obtained if the accelerator pedal is rapidly depressed. The patent document 2 (listed below) shows a method for solving this problem.

That is, according to the patent document 2, the transmission control is performed so that the minimum fuel consumption rate operation is performed when the engine operating condition is in a steady state. On the other hand, when the difference between the target engine output according to the accelerator operation amount and the actual engine output is great, a control for shifting from the minimum fuel consumption rate operation to the operation for obtaining good acceleration response, is performed.

Further, the patent document 3 (listed below) discloses a control system in which a target throttle valve opening is calculated from the accelerator operation amount, and an actual throttle valve opening is controlled so as to coincide with the target throttle valve opening. In this control system, a plurality of conversion tables which differ in the conversion characteristics for calculating the target throttle valve opening from the accelerator operation amount are provided, and the suitable conversion table is selected according to the setting of an operation mode switch.

PRIOR ART DOCUMENT

Patent Document

[Patent Document 1] Japanese Patent Laid-open No. S58-39870
[Patent Document 2] Japanese Patent Laid-open No. S63-38742
[Patent Document 3] Japanese Patent Laid-open No. S59-74341

SUMMARY OF THE INVENTION

Problems To Be Solved by the Invention

By combining the conventional control methods described above, the operation for suppressing the fuel consumption rate, or the operation for good acceleration response can be performed according to the setting of the operation mode switch, i.e., the driver's selection.

However, when a driver with few driving experience performs the minimum fuel consumption rate operation, the problem may occur as described below. That is, the driver may operate the accelerator pedal such that the accelerator operation amount is not maintained at a constant level but slightly changes (this operation will be referred as to "flutter operation"), and the flutter operation may make the engine operation deviate from the minimum fuel consumption rate operation, and deteriorate the fuel consumption rate.

The present invention was made contemplating the above described point, and an object of the invention is to provide a control system for a vehicle, which appropriately controls the engine output according to an operation amount of the accelerator pedal, and can suppress deterioration of the fuel consumption rate even when the flutter operation is performed.

Means for Solving the Problems

To attain the above-described object, the present invention provides a control system for a vehicle which has a continuously variable transmission (20) and is driven by an internal combustion engine (1) through the continuously variable transmission (20). This control system includes driving force parameter setting means, driving force control means (3), target value setting means, actuating means, target rotational speed setting means, transmission control means, and an operation mode switch (15). The driving force parameter setting means sets a demand driving force parameter (APREQ) indicative of a demand driving force of the engine based on an operation amount of an accelerator pedal (AP) of the vehicle. The driving force control means controls a driving force of the engine, and the target value setting means sets a target value (THCMD) of a control amount (TH) of the driving force control means based on the demand driving force parameter (APREQ). The actuating means actuates the driving force control means (3) so that the control amount (TH) coincides with the target value (THCMD). The target rotational speed setting means sets a target rotational speed (NEOBJ) of the engine based on the demand driving force parameter (APREQ). The transmission control means controls the continuously variable transmission (20) so that a rotational speed (NE) of the engine coincides with the target rotational speed (NEOBJ). The operation mode switch is provided for switching between at least a first operation mode (normal operation mode or sport operation mode) and a second operation mode (eco operation mode). The fuel consumption rate in the second operation mode is less than that in the first operation mode. The driving force parameter setting means includes first characteristic switching means for setting the demand driving force parameter (APREQ) corresponding to the operation amount of the accelerator pedal (AP) to a value less than the value of the demand driving force parameter in the first operation mode, when the second operation mode (eco operation mode) is specified by the operation mode switch. The target value setting means includes second characteristic switching means for calculating the target value (THCMD) based on a first predetermined characteristic (THBE map) preliminarily set according to the engine rotational speed (NE) and the demand driving force parameter (APREQ), when the second operation mode (eco operation mode) is specified by the operation mode switch. The first predetermined characteristic (THBE map) is set so that the target value (THCMD) corresponding to the same engine rotational speed (NE) is substantially constant in a first predetermined range (RCST1) of the driving force parameter (APREQ).

With this configuration, the demand driving force parameter is set based on the operation amount of the accelerator pedal of the vehicle, the target value of the control amount of the driving force control means is set based on the demand driving force parameter, and the driving force control means is actuated so that the control amount of the driving force control means coincides with the target value. Further, the target rotational speed of the engine is set based on the demand driving force parameter, and the continuously variable transmission is controlled so that the engine rotational speed coincides with the target rotational speed. When the second operation mode, in which the fuel consumption rate is less than that in the first operation mode, is specified by the operation mode switch, the demand driving force parameter corresponding to the accelerator operation amount is set to a value less than the value in the first operation mode, and the target value of the control amount is calculated based on the first predetermined characteristic preliminarily set according to the engine rotational speed and the demand driving force parameter. The first predetermined characteristic is set so that the target value corresponding to the same engine rotational speed is substantially constant in the first predetermined range of the demand driving force parameter. Accordingly, when the accelerator operation amount changes due to the flutter operation, the target value is maintained at a substantially constant value if the demand driving force parameter is in the first predetermined range. Consequently, the deterioration of the fuel consumption rate is suppressed even when the flutter operation is performed.

Preferably, the second characteristic switching means calculates the target value (THCMD) based on the second predetermined characteristic (THBN map) preliminarily set according to the engine rotational speed (NE) and the demand driving force parameter (APREQ) when the first operation mode (normal operation mode) is specified by the operation mode switch. The second predetermined characteristic (THBN map) is set so that the target value (THCMD) corresponding to the same engine rotational speed (NE) is substantially constant in a second predetermined range (RCST2) of the demand driving force parameter (APREQ), and the second predetermined range (RCST2) is narrower than the first predetermined range (RCST1).

With this configuration, when the first operation mode is specified by the operation mode switch, the target value of the control amount is calculated based on the second predetermined characteristic preliminarily set according to the engine rotational speed and the demand driving force parameter. The second predetermined characteristic is set so that the target value corresponding to the same engine rotational speed is substantially constant in the second predetermined range of the demand driving force parameter, and the second predetermined range is set narrower than the first predetermined range. Therefore, in the first operation mode, the range where the target value changes in response to the change in the accelerator operation amount is wider than that in the second operation mode, and the acceleration response can be improved compared with the second operation mode.

Preferably, the second characteristic switching means calculates the target value (THCMD) based on a third predetermined characteristic (THBS table) preliminarily set according to the demand driving force parameter (APREQ) when the first operation mode (sport operation mode) is specified by the operation mode switch. The third predetermined characteristic (THBS table) is set so that the target value (TH-CMD) is uniquely determined corresponding to the demand driving force parameter (APREQ) and the target value (TH-CMD) increases as the demand driving force parameter (APREQ) increases.

With this configuration, the target value of the control amount is calculated based on the third predetermined characteristic preliminarily set according to the demand driving force parameter. Since the third predetermined characteristic is set so that the target value is uniquely determined corresponding to the demand driving force parameter and the target value increases as the demand driving force parameter increases, the target value changes in response to the change in the accelerator operation amount in the first operation mode, and the acceleration response can be improved compared with the second operation mode.

Preferably, the transmission control means makes a response speed of the continuously variable transmission slower when the second operation mode is specified by the operation mode switch, compared with the response speed in the first operation mode specified by the operation mode switch.

With this configuration, when the second operation mode is specified, the response speed of the continuously variable transmission is controlled to be slower than the response speed in the first operation mode. Therefore, the fuel consumption rate is certainly prevented from deteriorating when the flutter operation is performed.

MODE FOR CARRYING OUT THE INVENTION

Preferred embodiments of the present invention will now be described with reference to the drawings.

Figure 1:
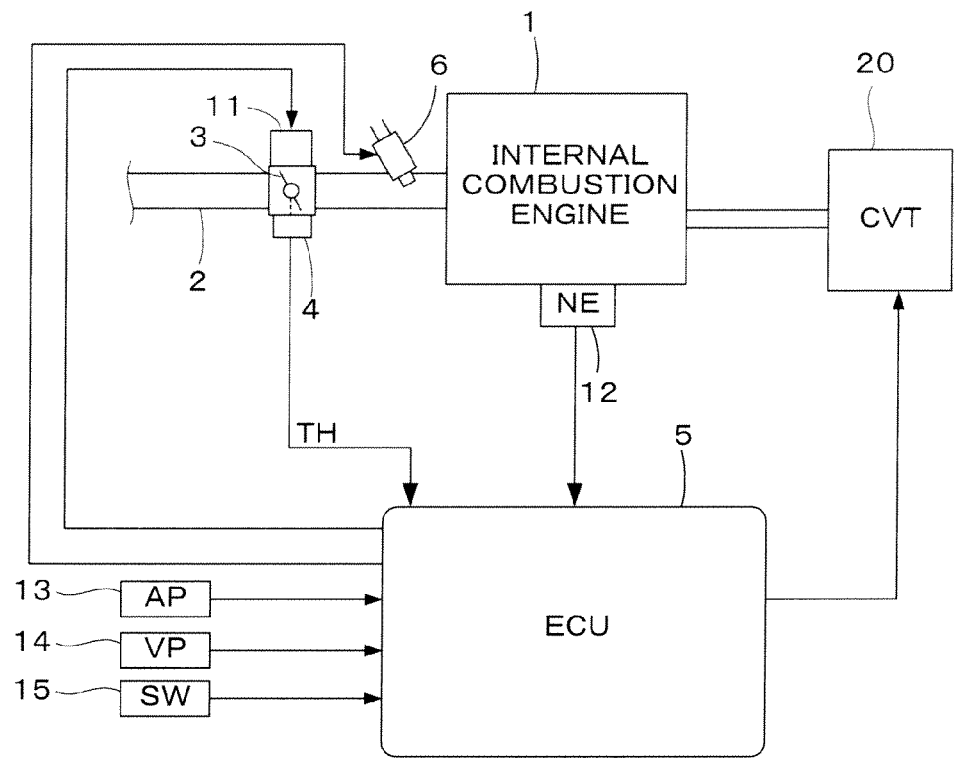
FIG. 1 shows a configuration of an internal combustion engine and a continuously variable transmission mounted on a vehicle, and a control system therefor according to one embodiment of the present invention.

FIG. 1 is a schematic diagram showing a configuration of an internal combustion engine and a continuously variable transmission which are mounted on a vehicle and a control system therefor according to one embodiment of the present invention. The internal combustion engine 1 (hereinafter referred to as "engine") has an intake pipe 2 provided with a throttle valve 3. The throttle valve 3 is provided with a throttle valve opening sensor 4 for detecting an opening TH of the throttle valve 3, and a detection signal of the throttle valve opening sensor 4 is supplied to an electronic control unit 5 (hereinafter referred to as "ECU"). An actuator 11 for actuating the throttle valve 3 is connected to the throttle valve 3, and an operation of the actuator 11 is controlled by the ECU 5.

A fuel injection valve 6 is provided for each cylinder at a position slightly upstream of an intake valve. Each injection valve is connected to a fuel pump (not shown) and electrically connected to the ECU 5. A valve opening period and a valve opening timing of each fuel injection valve 6 are controlled by the signal from the ECU 5.

An engine rotational speed sensor 12, an accelerator sensor 13, a vehicle speed sensor 14 and an operation mode switch 15 are also connected to the ECU 5. The engine rotational speed sensor 12 detects a rotational speed NE of the engine 1. The accelerator sensor 13 detects a depression amount AP of an accelerator pedal of the vehicle driven by the engine 1 (this depression amount will be hereinafter referred to as "accelerator operation amount"). The vehicle speed sensor 14 detects a running speed (vehicle speed) VP of the vehicle. The operation mode switch 15 is provided for the driver to set an operation mode of the vehicle. The detection signals from these sensors and a signal indicative of the setting of the operation mode switch 15 are supplied to the ECU 5. In this embodiment, three operation modes, i.e., a low fuel consumption rate operation mode (hereinafter referred to as "eco operation mode"), a sport operation mode, and a normal operation mode are available. In the eco operation mode, suppression of the fuel consumption rate has priority. In the sport operation mode, the acceleration response of the engine 1 has priority over the suppression of the fuel consumption rate. The normal operation mode is a medium operation mode between the eco operation mode and the sport operation mode, and has a medium operation characteristic.

Sensors, such as an engine coolant temperature sensor, an intake air temperature sensor, an intake pressure sensor, which are not shown, are also connected to the ECU 5.

An output shaft of the engine 1 is connected to the continuously variable transmission (hereinafter referred to as "CVT") 20. The output shaft of the CVT 20 drives driving wheels of the vehicle through a drive mechanism. The CVT 20 is connected to the ECU 5, and the transmission control is performed by the ECU 5.

The ECU 5 includes an input circuit having various functions including a function of shaping the waveforms of input signals from the various sensors described above, a function of correcting the voltage levels of the input signals to a predetermined level, and a function of converting an analog signal values into a digital signal values. The ECU 5 further includes a central processing unit (hereinafter referred to as "CPU"), a memory circuit and an output circuit. The memory circuit preliminarily stores various operating programs to be executed by the CPU and results of computation or the like by the CPU. The output circuit supplies drive signals to the actuator 11, the fuel injection valve 6, and the CVT 20.

The ECU 5 calculates a target opening THCMD of the throttle valve 3 according to the accelerator operation amount AP, the vehicle speed VP, the setting of the operation mode switch 15, and the like. The ECU 5 drives the actuator 11 so that a detected throttle valve opening TH coincides with the target opening THCMD. Further, the ECU 5 calculates a target engine rotational speed NEOBJ according to the accelerator operation amount AP, the vehicle speed VP, the setting of the operation mode switch 15, and the like. The ECU 5 performs the gear-ratio control of the CVT 20 so that the engine rotational speed NE coincides with the target engine rotational speed NEOBJ.

Figure 2:
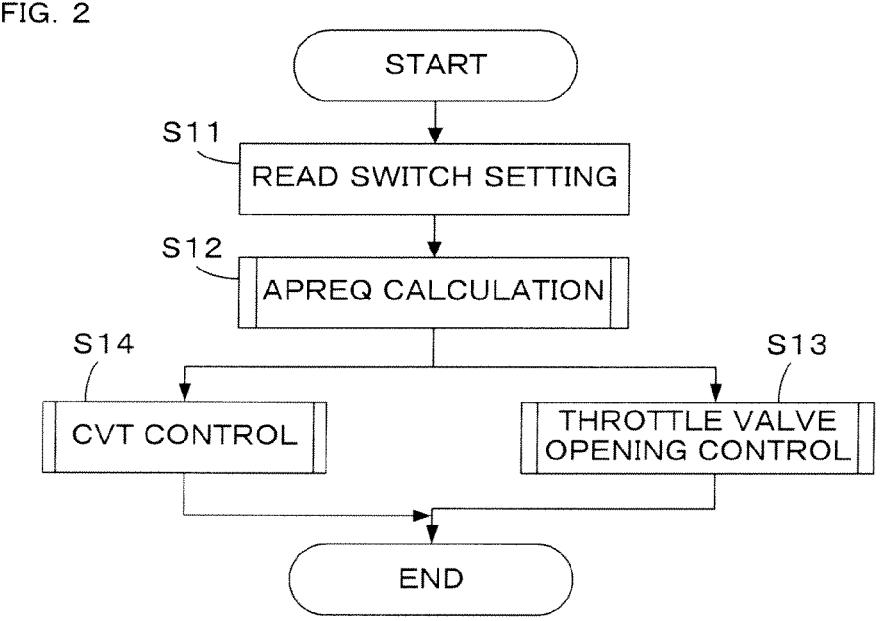
FIG. 2 is a flowchart for illustrating a general configuration of a throttle valve opening control of the internal combustion engine and a transmission control of the continuously variable transmission.

FIG. 2 is a flowchart for illustrating general configuration of the throttle valve opening control and the CVT control by the ECU 5.

Figure 3:
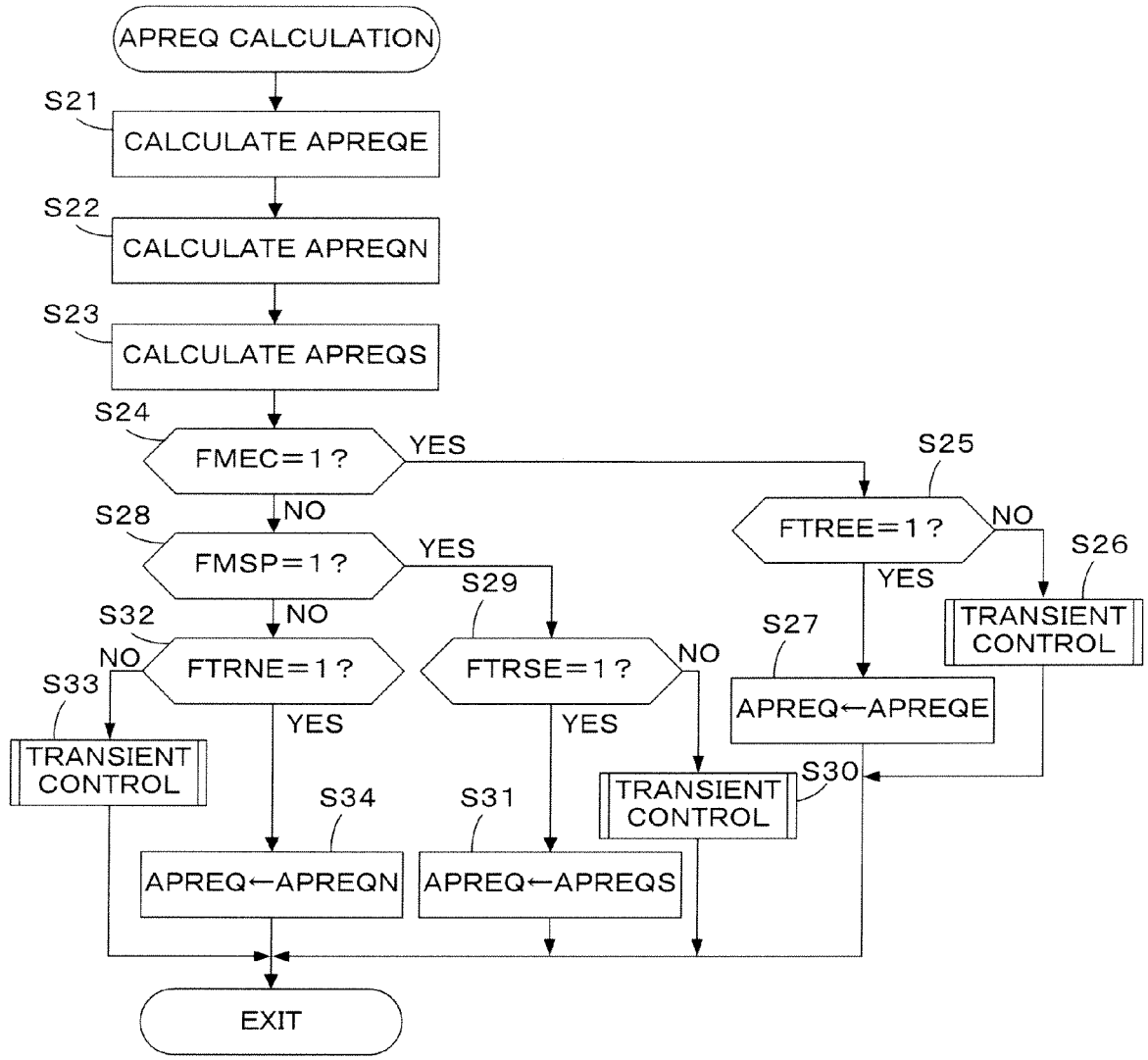
FIG. 3 is a flowchart of a process for calculating a demand driving force parameter (APREQ).

In step S11, the setting of the operation mode switch 15 is read. In step S12, an APREQ calculation process shown in FIG. 3 is executed, to calculate a demand driving force parameter APREQ.

In step S13, the throttle valve opening control is performed based on the demand driving force parameter APREQ calculated in step S12. On the other hand, in step S14, the CVT control is performed based on the demand driving force parameter APREQ.

Specifically, the target engine rotational speed NEOBJ is set according to the demand driving force parameter APREQ, and the gear-ratio control is performed so that the engine rotational speed NE coincides with the target engine rotational speed NEOBJ. In a predetermined operating condition which is determined according to the demand driving force parameter APREQ and the operation mode selected with the operation mode switch 15, the target engine rotational speed NEOBJ is set so that the minimum fuel consumption rate operation is realized.

Further, a response speed (a gear-ratio change response speed) VFB upon controlling the engine rotational speed NE so as to coincide with the target engine rotational speed NEOBJ, is set according to the selected operation mode. That is, an eco operation response speed VFBE is selected in the eco operation mode, a normal operation response speed VFBN is selected in the normal operation mode, and a sport operation response speed VFBS is selected in a sport operation mode. The eco operation response speed VFBE, the normal operation response speed VFBN, and the sport operation response speed VFBS are set so that the relationship of VFBE<VFBN<VFBS is satisfied. By setting the eco operation response speed VFBN to a value less than the response speed of other operation modes as described above, the fuel consumption rate is certainly prevented from deteriorating when the flutter operation is performed. The response speed VFB changed by changing the gain coefficient of the feedback control for making the engine rotational speed NE coincide with the target engine rotational speed NEOBJ. Alternatively, the response speed VFB may be substantially changed by using different maps for calculating the target engine rotational speed NEOBJ according to the demand driving force parameter APREQ. The maps may be set so that the different response speed is realized in each operation mode.

Figure 4:
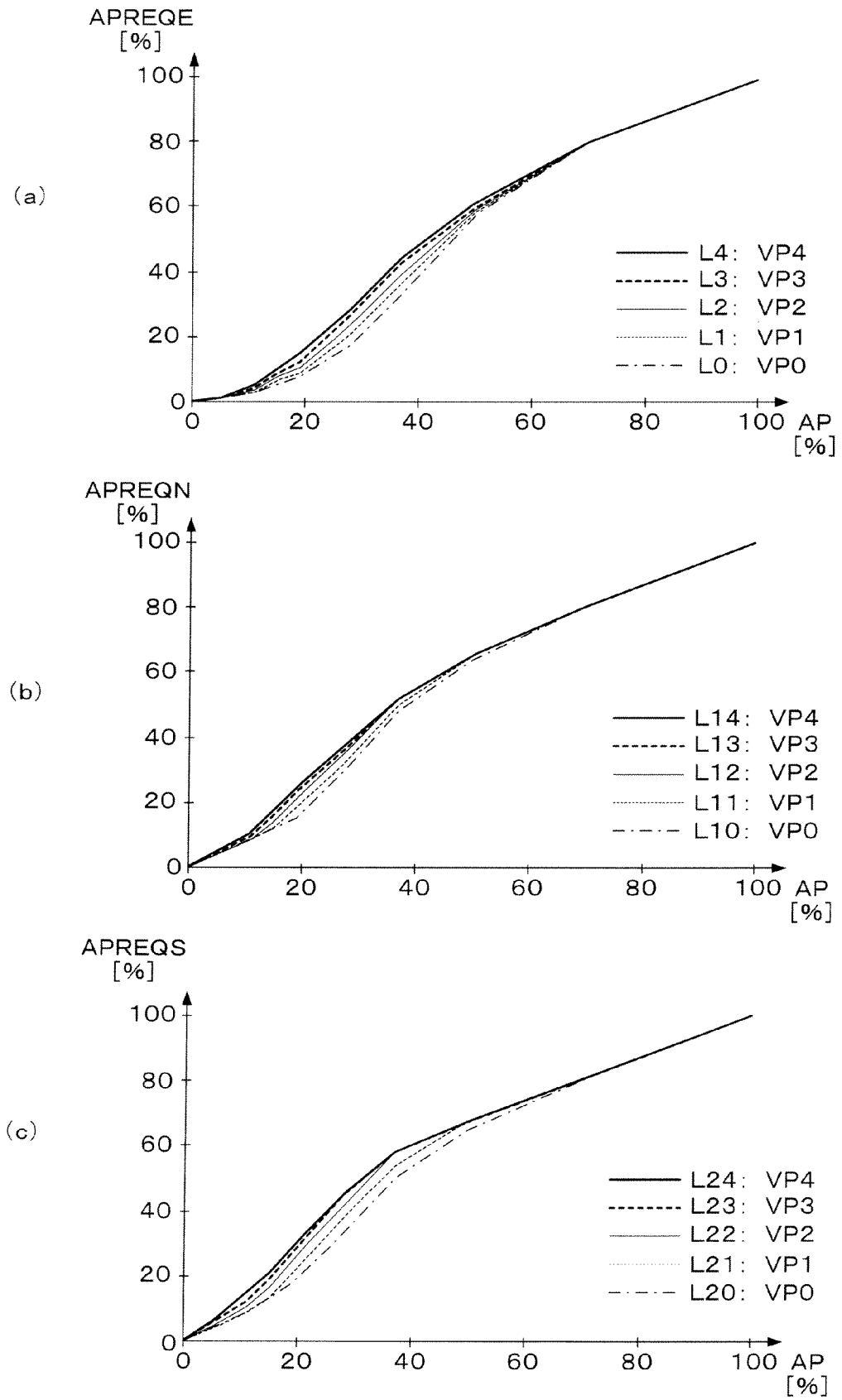
FIG. 4 shows maps referred to in the process of FIG. 3.

FIG. 3 shows a flowchart of a process for calculating the demand driving force parameter APREQ. This process is executed at predetermined time intervals by the CPU in the ECU 5. In step S21, an APREQE map shown in FIG. 4(a) is retrieved according to the accelerator operation amount AP and the vehicle speed VP, to calculate an eco operation demand driving force parameter APREQE corresponding to the eco operation mode. The dot-and-dash line L0, the thin dashed line L1, the thin solid line L2, the thick dashed line L3, and the thick solid line L4 shown in FIG. 4(a) respectively correspond to the predetermined vehicle speeds VP0 (e.g., 0 km/h), VP1 (e.g., 20 km/h), VP2 (e.g., 60 km/h), VP3 (e.g., 80 km/h), and VP4 (e.g., 120 km/h). That is, the APREQE map is basically set so that the eco operation demand driving force parameter APREQE increases as the accelerator operation amount AP increases. In the range where the accelerator operation amount AP is less than about 70%, the APREQE map is set so that the eco operation demand driving force parameter APREQE increases as the vehicle speed VP increases.

In step S22, an APREQN map shown in FIG. 4(b) is retrieved according to the accelerator operation amount AP and the vehicle speed VP, to calculate a normal operation demand driving force parameter APREQN corresponding to the normal operation mode. The dot-and-dash line L10, the thin dashed line L11, the thin solid line L12, the thick dashed line L13, and the thick solid line L14 shown in FIG. 4(b) respectively correspond to the predetermined vehicle speeds VP0, VP1, VP2, VP3, and VP4. That is, the APREQN map is basically set so that the normal operation demand driving force parameter APREQN increases as the accelerator operation amount AP increases. In the range where the accelerator operation amount AP is less than about 70%, the APREQN map is set so that the normal operation demand driving force parameter APREQN increases as the vehicle speed VP increases. Further, in the range where the accelerator operation amount AP is less than about 40%, the APREQN map is set so that the inclinations of the lines L10 to L14 are respectively greater than the inclinations of the lines L0 to L4 in the APREQE map shown in FIG. 4(a).

In step S23, an APREQS map shown in FIG. 4(c) is retrieved according to the accelerator operation amount AP and the vehicle speed VP, to calculate a sport operation demand driving force parameter APREQS corresponding to the sport operation mode. The dot-and-dash line L20, the thin dashed line L21, the thin solid line L22, the thick dashed line L23, and the thick solid line L24 shown in FIG. 4(c) respectively correspond to the predetermined vehicle speeds VP0, VP1, VP2, VP3, and VP4. That is, the APREQS map is basically set so that the sport operation demand driving force parameter APREQS increases as the accelerator operation amount AP increases. In the range where the accelerator operation amount AP is less than about 70%, the APREQS map is set so that the sport operation demand driving force parameter APREQS increases as the vehicle speed VP increases. Further, in the range from about 10% to 40% of the accelerator operation amount AP, the APREQS map is set so that the inclinations of the lines L20 to L24 are respectively greater than the inclinations of the lines L10 to L14 in the APREQN map shown in FIG. 4(b).

In step S24, it is determined whether or not the eco operation mode flag FMEC is equal to "1". The eco operation mode flag FMEC is set to "1" when the operation mode switch 15 is set to the eco operation mode. If the answer to step S24 is affirmative (YES), it is determined whether or not a first transient control end flag FTREE is equal to "1". Immediately after the transition from other operation modes (the normal operation mode or the sport operation mode) to the eco operation mode, the first transient control end flag FTREE is equal to "0". Accordingly, the process proceeds to step S26, in which a transient control is performed for making the demand driving force parameter APREQ gradually shift from the demand driving force parameter (APREQN or APREQS) of other operation modes to the eco operation demand driving force parameter APREQE.

If the transition to the eco operation demand driving force parameter APREQE is completed, the first transient control end flag FTREE is set to "1". Then, the process proceeds from step S25 to step S27. In step S27, the demand driving force parameter APREQ is set to the eco operation demand driving force parameter APREQE.

If FMEC is equal to "0" in step S24, the process proceeds to step S28, in which it is determined whether or not a sport operation mode flag FMSP is equal to "1". The sport operation mode flag FMSP is set to "1" when the operation mode switch 15 is set to the sport operation mode. If the answer to step S28 is affirmative (YES), it is determined whether or not a second transient control end flag FTRSE is equal to "1". Immediately after the transition from other operation modes (the normal operation mode or the eco operation mode) to the sport operation mode, the second transient control end flag FTRSE is equal to "0". Accordingly, the process proceeds to step S30, in which the transient control for making the demand driving force parameter APREQ gradually shift from the demand driving force parameter (APREQN or APREQE) of other operation modes to the sport operation demand driving force parameter APREQS, is performed.

If the transition to the sport operation demand driving force parameter APREQS is completed, the second transient control end flag FTRSE is set to "1", and the process proceeds from step S29 to step S31. In step S31, the demand driving force parameter APREQ is set to the sport operation demand driving force parameter APREQS.

If FMSP is equal to "0" in step S28, i.e., the operation mode switch 15 is set to the normal operation mode, the process proceeds to step S32, in which it is determined whether or not a third transient control end flag FTRNE is equal to "1". Immediately after the transition from other operation modes (the sport operation mode or the eco operation mode) to the normal operation mode, the third transient control end flag FTRNE is equal to "0". Therefore, the process proceeds to step S33, in which the transient control for making the demand driving force parameter APREQ gradually shift from the demand driving force parameter (APREQE or APREQS) of other operation modes to the normal operation demand driving force parameter APREQN, is performed.

If the transition to the normal operation demand driving force parameter APREQN is completed, the third transient control end flag FTRNE is set to "1", and the process proceeds from step S32 to step S34. In step S34, the demand driving force parameter APREQ is set to the normal operation demand driving force parameter APREQN.

Figure 5:
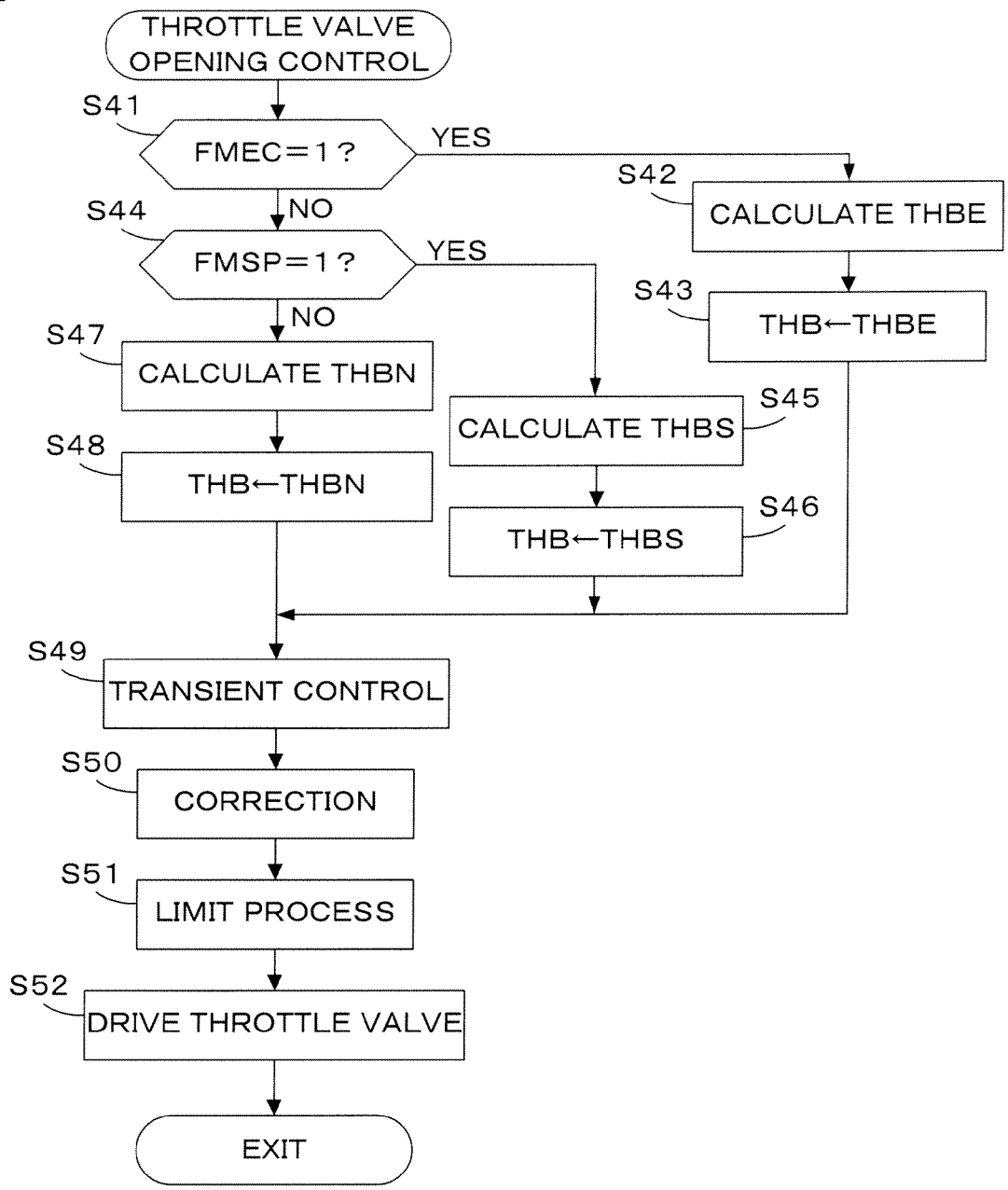
FIG. 5 is a flowchart of a throttle valve opening control process.

FIG. 5 is a flowchart of an opening control process of the throttle valve 3. This process is executed at predetermined time intervals by the CPU in the ECU 5.

In step S41, it determined whether or not the eco operation mode flag FMEC is equal to "1". If the answer to step S41 is affirmative (YES), a THBE map shown in FIG. 6(a) is retrieved according to the demand driving force parameter APREQ and the engine rotational speed NE, to calculate an eco operation basic target opening THBE (step S42). The eco operation basic target opening THBE is a basic value of the target opening THCMD applied in the eco operation mode.

The dot-and-dash line L31, the thin dashed line L32, the thin solid line L33, the dashed line L34 and the solid line L35 shown in FIG. 6(a) respectively correspond to the predetermined engine rotational speeds NE1 (e.g., 1000 rpm), NE2 (e.g., 1250 rpm), NE3 (e.g., 1500 rpm), NE4 (e.g., 2000 rpm), and NE5 (e.g., 3000 rpm). The thick solid line L36 corresponds to rotational speeds greater than a predetermined rotational speed NE6 (e.g., 3500 rpm).

That is, the THBE map is basically set so that the eco operation basic target opening THBE increases as the demand driving force parameter APREQ increases. In the range where the demand driving force parameter APREQ takes a value from about 10% to 70%, the THBE map is set so that the eco operation basic target opening THBE increases as the engine rotational speed NE increases. Further, when the engine rotational speed NE is equal to the predetermined rotational speed NE1 and the demand driving force parameter APREQ is in a predetermined range RCST1, the eco operation basic target opening THBE is set to a constant value regardless of a change in the demand driving force parameter APREQ. The predetermined range RCST1 will be hereinafter referred to as "constant target opening range RCST1". The constant target opening range RCST1 corresponding to the predetermined rotational speed NE1 is shown in FIG. 6(a). As apparent from FIG. 6(a), the constant target opening range RCST1 is also set corresponding respectively to other predetermined rotational speeds NE2 to NE5. It is to be noted that the constant target opening range RCST1 is set to be narrower as the engine rotational speed NE becomes higher.

The gear-ratio change response speed of the CVT 20 is slower compared with the response speed of the throttle valve opening control. Therefore, by limiting changes in the throttle valve opening TH within the constant target opening range RCST1, the transmission control and the throttle valve opening control coordinate with each other to surely realize the minimum fuel consumption rate operation.

In step S43, the basic target throttle valve opening THB is set to the eco operation basic target opening THBE, and the process proceeds to step S49.

If FMEC is equal to "0" in step S41, the process proceeds to step S44, in which it is determined whether or not the sport operation mode flag FMSP is equal to "1". If the answer to step S44 is affirmative (YES), a THBS table shown in FIG. 6(*c*) is retrieved according to the demand driving force parameter APREQ, to calculate a sport operation basic target opening THBS (step S45). The sport operation basic target opening THBS is a basic value of the target opening THCMD applied in the sport operation mode.

The THBS table is used with respect to all of the engine rotational speeds NE, and the sport operation basic target opening THBS is uniquely set corresponding to the demand driving force parameter APREQ, without depending on the engine rotational speed NE. That is, as shown by the solid line L51 of FIG. 6(*c*), the sport operation basic target opening THBS is set so as to be proportional to the demand driving force parameter APREQ.

In step S46, the basic target throttle valve opening THB is set to the sport operation basic target opening THBS, and the process proceeds to step S49.

Figure 6:
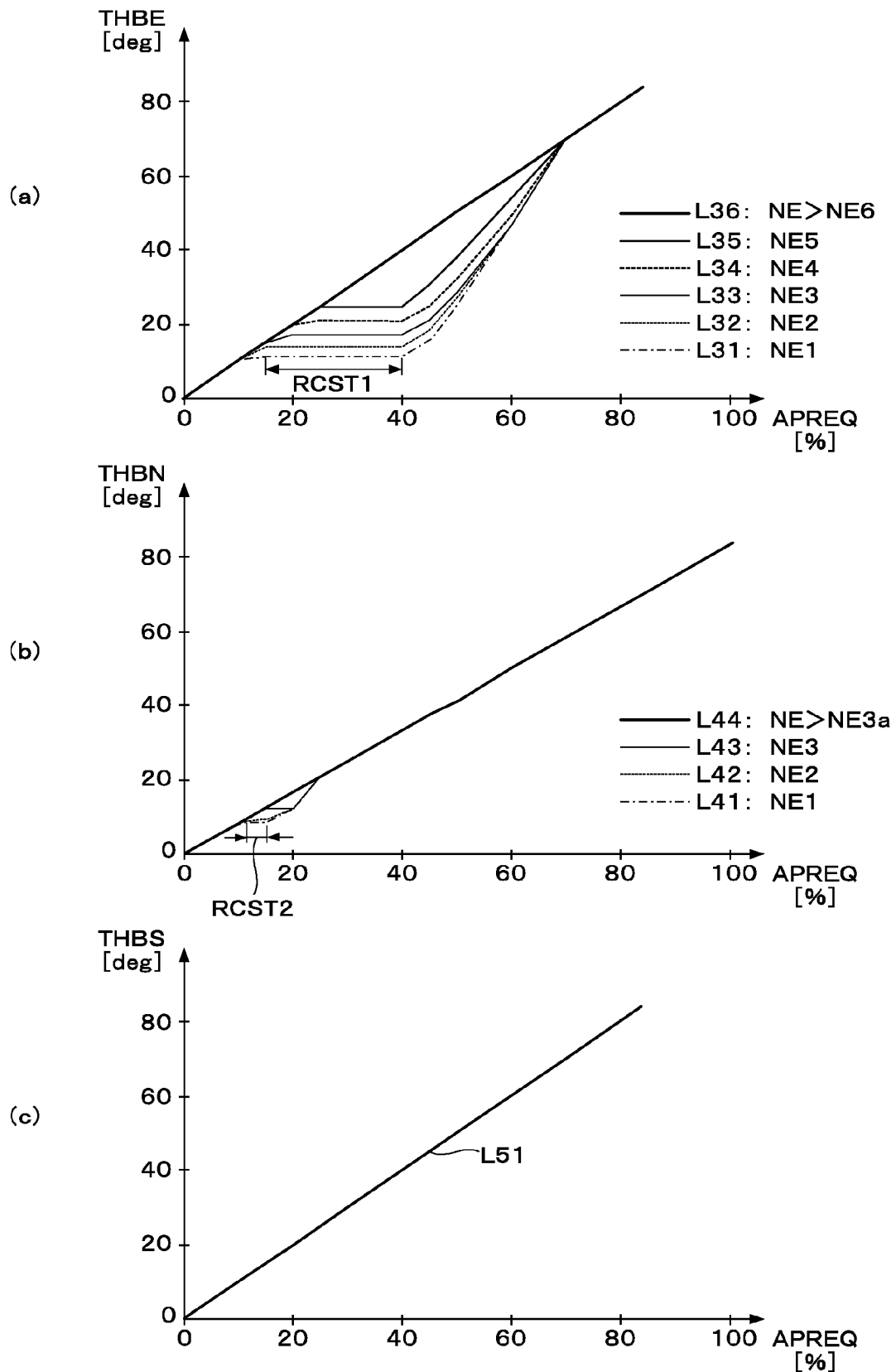
FIG. 6 shows maps and a table which are referred to in the process of FIG. 5.

If FMSP is equal to "0" in step S44, i.e., the operation mode switch 15 is set to the normal operation mode, a THBN map shown in FIG. 6(*b*) is retrieved according to the demand driving force parameter APREQ and the engine rotational speed NE, to calculate a normal operation basic target opening THBN (step S47). The normal operation basic target opening THBN is a basic value of the target opening THCMD applied in the normal operation mode.

The dot-and-dash line L41, the thin dashed line L42, and the thin solid line L43 shown in FIG. 6(*b*) respectively correspond to the predetermined engine rotational speeds NE1, NE2, and NE3, and the thick solid line L44 corresponds to rotational speeds greater than a predetermined rotational speed NE3*a* (e.g., 1750 rpm). That is, the THBN map is basically set so that the normal operation basic target opening THBN increases as the demand driving force parameter APREQ increases. In the range where the demand driving force parameter APREQ takes a value from about 10% to 30%, a constant target opening range RCST2 is provided where the engine rotational speed NE takes a value less than a predetermined rotational speed NE3. It is to be noted that the constant target opening range RCST2 shown in FIG. 6(*b*) is set to be narrower than the constant target opening range RCST1 of the THBE map shown in FIG. 6(*a*).

In step S48, the basic target throttle valve opening THB is set to the normal operation basic target opening THBN, and the process proceeds to step S49.

In step S49, a transient control is performed for suppressing a rate of change in the basic target throttle valve opening THB when the basic target throttle valve opening THB rapidly changes upon switching of the operation mode, or rapid increase in the accelerator operation amount AP. In step S50, a correction calculation of adding correction terms (e.g., a correction term for the idling operation) to the basic target throttle valve opening THB is performed to calculate the target opening THCMD. In step S51, a limit process is performed for limiting the target opening THCMD within a range defined by a predetermined upper limit value and a predetermined lower limit value. The changing manner of the target opening THCMD is the same as that of the basic target throttle valve opening THB except for the condition immediately after switching of the operation mode, the idling condition, and the like.

In step S52, the drive control of the actuator 11 is performed so that the detected throttle valve opening TH coincides with the target opening THCMD.

As described above, in this embodiment, the demand driving force parameter APREQ is set based on the accelerator operation amount AP, the basic target throttle valve opening THB is set based on the demand driving force parameter APREQ, and the target opening THCMD is calculated from the basic target throttle valve opening THB. Subsequently, the throttle valve 3 is actuated so that the actual throttle valve opening TH coincides with the target opening THCMD. Further, the target engine rotational speed NEOBJ is set based on the demand driving force parameter APREQ, and the CVT 20 is controlled so that the engine rotational speed NE coincides with the target engine rotational speed NEOBJ.

When the eco operation mode is selected with the operation mode switch 15, the demand driving force parameter APREQ corresponding to the accelerator operation amount AP is set to a value less than the value of the normal operation mode or the sport operation mode, and the basic target throttle valve opening THB is calculated using the THBE map which is set according to the engine rotational speed NE and the demand driving force parameter APREQ as shown in FIG. 6(*a*). The THBE map is set so that the basic target opening THBE corresponding to the same engine rotational speed NE is substantially constant if the demand driving force parameter APREQ is in the constant target opening range RCST1. Therefore, when the demand driving force parameter APREQ is in the constant target opening range RCST1, the basic target opening THBE is maintained at a constant value if the accelerator operation amount AP changes due to the flutter operation. Consequently, it is possible to suppress the deterioration of the fuel consumption rate even if the flutter operation of the accelerator pedal is performed.

Further, when the normal operation mode is selected with the operation mode switch 15, the normal operation basic target opening THBN is calculated using the THBN map which is set according to the engine rotational speed NE and the demand driving force parameter APREQ shown in FIG. 6(*b*). The THBN map is set similarly to the THBE so that the basic target opening THBN corresponding to the same engine rotational speed NE is substantially constant in the constant target opening range RCST2. Further the constant target opening range RCST2 of the THBN map is set to be narrower than the constant target opening range RCST1 of the THBE map. Therefore, in the normal operation mode, the range where the basic target opening THBE changes in response to a change in the accelerator operation amount AP is wider, and the acceleration response is improved compared with the eco operation mode.

Further, when the sport operation mode is selected with the operation mode switch 15, the sport operation basic target opening THBS is calculated using the THBS table shown in FIG. 6(*c*) which is set according to the demand driving force parameter APREQ. The THBS table is set so that the basic target opening THBS is uniquely determined corresponding to the demand driving force parameter APREQ without depending on the engine rotational speed NE, i.e., the basic target opening THBS is set to be proportional to the demand driving force parameter APREQ. Therefore, in the sport operation mode, the basic target throttle valve opening THB is set in proportion to the accelerator operation amount AP, and the acceleration response is improved compared with the eco operation mode and the normal operation mode.

In this embodiment, the throttle valve 3 corresponds to the driving force control means, and the ECU 5 constitutes the driving force parameter setting means, a part of the actuating means, the target value setting means, the target rotational speed setting means, the transmission control means, the first characteristic switching means, and the second characteristic switching means. The actuator 11 constitutes a part of actuating means. Specifically, the process of FIG. 3 constitutes the driving force parameter setting means and the first characteristic switching means, and the process of FIG. 5 constitutes a part of the actuating means, the target value setting means, and the second characteristic switching means. Step S14 of FIG. 2 corresponds to the target rotational speed setting means and the transmission control means.

The present invention is not limited to the embodiment described above, and various modifications may be made. In the above-described embodiment, an example of the vehicle driven by the internal combustion engine in which the throttle valve is used as the driving force control means, is shown. The present invention is applicable also to a vehicle which is driven by an internal combustion engine having a valve-actuating mechanism (for example, shown in Japanese Patent Laid-open No. 2008-25418) which can continuously change the lift amount and the valve opening period of the intake valves. When using such engine, the valve-actuating mechanism including the intake valves corresponds to the driving force control means, and the control parameter for changing the lift amount and the valve opening period of the intake valve corresponds to the control amount of the driving force control means. Further, the present invention is also applicable to a vehicle driven by a diesel engine. When using the diesel engine, the driving force control is performed by changing the fuel injection amount. Therefore, the fuel injection valve corresponds to the driving force control means, and the valve opening period of the fuel injection valve corresponds to the control amount.

Further, the present invention is also applicable to a control of the hybrid vehicle having a motor (electric motor) and an internal combustion engine as prime movers for driving the vehicle. In the hybrid vehicle, the fuel consumption rate can be further reduced by raising a ratio of the motor driving force with respect to the vehicle demand driving force when the eco operation mode is selected.

Further, in the above-described embodiment, an example of a control system for a vehicle wherein the three operation modes of the eco operation mode, the normal operation mode, and the sport operation mode are available, is shown. The present invention is also applicable to a control system for a vehicle wherein two operation modes of the eco operation mode and the normal operation mode are available.

Further, by applying the present invention to a control system for a vehicle having a function of coaching of the accelerator operation (indicating a preferable accelerator operation amount AP) to the driver, it is possible for the driver to easily perform the operation in accordance with the coaching for performing a low fuel consumption rate operation even if the driver is unaccustomed to driving a car, for example.

DESCRIPTION OF REFERENCE NUMERALS

1 Internal combustion engine
3 Throttle valve (driving force control means)
4 Throttle valve opening sensor
5 Electronic control unit (driving force parameter setting means, actuating means, target value setting means, target rotational speed setting means, transmission control means, first characteristic switching means, second characteristic switching means)
11 Actuator (actuating means)
12 Engine rotational speed sensor
13 Accelerator sensor
14 Vehicle speed sensor
15 Operation mode switch
20 Continuously variable transmission

We claim:

1. A control system for a vehicle which is provided with a continuously variable transmission and is driven by an internal combustion engine with said continuously variable transmission, said control system comprising:

driving force parameter setting means for setting a demand driving force parameter indicative of a demand driving force of said engine based on an operation amount of an accelerator pedal of said vehicle;

driving force control means for controlling a driving force of said engine;

target value setting means for setting a target value of a control amount of said driving force control means based on the demand driving force parameter;

actuating means for actuating said driving force control means so that the control amount coincides with the target value;

target rotational speed setting means for setting a target rotational speed of said engine according to at least one of an accelerator operation amount, a vehicle speed, and an operation mode of the vehicle based on the demand driving force parameter;

transmission control means for controlling said continuously variable transmission so that the rotational speed of said engine coincides with the target rotational speed; and an operation mode switch for switching between at least a first operation mode and a second operation mode, the fuel consumption rate in the second operation mode being less than the fuel consumption rate in the first operation mode, wherein said driving force parameter setting means includes first characteristic switching means for setting the demand driving force parameter corresponding to the operation amount of the accelerator pedal to a value which is smaller than a value of the demand driving force parameter in the first operation mode, when the second operation mode is specified by said operation mode switch, and said target value setting means includes second characteristic switching means for calculating the target value based on a first predetermined characteristic preliminarily set according to an actual engine rotational speed and the demand driving force parameter, when the second operation mode is specified by the operation mode switch, wherein the first predetermined characteristic is set so that the target value of the control amount corresponding to the same actual engine rotational speed is constant in a first predetermined range of the demand driving force parameter.

2. The control system according to claim 1, wherein said second characteristic switching means calculates the target value based on a second predetermined characteristic preliminarily set according to the engine rotational speed and the demand driving force parameter, when the first operation mode is specified by the operation mode switch, wherein the second predetermined characteristic is set so that the target value corresponding to the same engine rotational speed is constant in a second predetermined range of the demand driving force parameter, and the second predetermined range is narrower than the first predetermined range.

3. The control system according to claim 1, wherein said second characteristic switching means calculates the target value based on a third predetermined characteristic preliminarily set according to the demand driving force parameter, when the first operation mode is specified by the operation mode switch, wherein the third predetermined characteristic is set so that the target value is uniquely determined corresponding to the demand driving force parameter and the target value increases as the demand driving force parameter increases.

4. The control system according to claim 1, wherein said transmission control means makes a response speed of the continuously variable transmission slower when the second operation mode is specified by the operation mode switch, compared with the response speed in the first operation mode specified by the operation mode switch.

5. A control method for a vehicle which is provided with a continuously variable transmission and a operation mode switch for switching between at least a first operation mode and a second operation mode, wherein said vehicle is driven by an internal combustion engine with said continuously variable transmission and the fuel consumption rate in the second operation mode is less than the fuel consumption rate in the first operation mode, said control method comprising the steps of:

a) setting a demand driving force parameter indicative of a demand driving force of said engine based on an operation amount of an accelerator pedal of said vehicle;

b) setting a target value of a control amount of a driving force control device based on the demand driving force parameter, said driving force control device controlling a driving force of said engine;

c) actuating said driving force control device so that the control amount coincides with the target value;

d) setting a target rotational speed of said engine according to at least one of an accelerator operation amount, a vehicle speed, and an operation mode of the vehicle based on the demand driving force parameter; and e) controlling the continuously variable transmission so that the rotational speed of said engine coincides with the target rotational speed, wherein the demand driving force parameter corresponding to the operation amount of the accelerator pedal is set to a value which is smaller than a value of the demand driving force parameter in the first operation mode, when the second operation mode is specified by said operation mode switch, and the target value is calculated based on a first predetermined characteristic preliminarily set according to an actual engine rotational speed and the demand driving force parameter, when the second operation mode is specified by the operation mode switch, wherein the first predetermined characteristic is set so that the target value of the control amount corresponding to the same actual engine rotational speed is constant in the first predetermined range of the demand driving force parameter.

6. The control method according to claim 5, wherein the target value is calculated based on a second predetermined characteristic preliminarily set according to the engine rotational speed and the demand driving force parameter, when the first operation mode is specified by the operation mode switch, wherein the second predetermined characteristic is set so that the target value corresponding to the same engine rotational speed is constant in a second predetermined range of the demand driving force parameter and the second predetermined range is narrower than the first predetermined range.

7. The control method according to claim 5, wherein the target value is calculated based on a third predetermined characteristic preliminarily set according to the demand driving force parameter, when the first operation mode is specified by the operation mode switch, wherein the third predetermined characteristic is set so that the target value is uniquely determined corresponding to the demand driving force parameter and the target value increases as the demand driving force parameter increases.

8. The control method according to claim 5, wherein a response speed of the continuously variable transmission speed is controlled to be slower when the second operation mode is specified by the operation mode switch, compared with the response speed in the first operation mode specified by the operation mode switch.

* * * * *